(12) United States Patent
Jun

(10) Patent No.: US 7,251,295 B2
(45) Date of Patent: Jul. 31, 2007

(54) APPARATUS FOR RECOVERING CARRIER

(75) Inventor: Jung Sig Jun, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 10/676,070

(22) Filed: Oct. 2, 2003

(65) Prior Publication Data
US 2004/0067039 A1 Apr. 8, 2004

(30) Foreign Application Priority Data
Oct. 4, 2002 (KR) ............... 10-2002-0060712

(51) Int. Cl.
*H04L 27/14* (2006.01)
*H04L 27/22* (2006.01)

(52) U.S. Cl. ............ 375/326; 375/332; 375/344; 329/306; 329/346

(58) Field of Classification Search ........ 375/279–281, 375/326, 329, 332, 344; 329/304, 306, 307, 329/308, 345, 346
See application file for complete search history.

(56) References Cited

U.S. PATENT DOCUMENTS

| | | | | |
|---|---|---|---|---|
| 5,796,786 A | * | 8/1998 | Lee | 375/326 |
| 5,799,037 A | * | 8/1998 | Strolle et al. | 375/233 |
| 6,023,491 A | * | 2/2000 | Saka et al. | 375/326 |
| 6,115,431 A | * | 9/2000 | Lee | 375/324 |
| 6,191,649 B1 | * | 2/2001 | Sugita et al. | 329/304 |
| 6,192,088 B1 | * | 2/2001 | Aman et al. | 375/326 |
| 6,671,339 B1 | * | 12/2003 | Ahn | 375/346 |
| 2001/0006539 A1 | * | 7/2001 | Kim | 375/321 |
| 2002/0105599 A1 | * | 8/2002 | Hong et al. | 348/726 |

* cited by examiner

*Primary Examiner*—Young T. Tse
(74) *Attorney, Agent, or Firm*—Birch, Stewart, Kolasch & Birch, LLP

(57) ABSTRACT

An apparatus for recovering a carrier is disclosed, for recovering a carrier correctly even though ghost exists in a signal received in a television, which includes a signal converter outputting baseband I, Q signals by multiplying digitized passband I, Q signals by a complex carrier according to a phase error; first and second filters removing data components of the baseband I, Q signals; a divider dividing a signal outputted from the second filter by a signal outputted from the first filter; a multiplier multiplying a signal outputted from the divider by the baseband I signal delayed for a predetermined time period; and an oscillator generating a complex carrier according to a signal outputted from the multiplier.

12 Claims, 7 Drawing Sheets phase 0° phase 180° phase 0° phase 180°

APPARATUS FOR RECOVERING CARRIER

This application claims the benefit of the Korean Application No. P2002-60712 filed on Oct. 4, 2002, which is hereby incorporated by reference.

BACKGROUND OF THE INVENTION

1. Field of the Invention

The present invention relates to a digital TV receiver, and more particularly, to an apparatus for recovering a carrier in a VSB system digital TV receiver.

2. Background of the Related Art

The VSB system, employed as Korean and the USA digital TV (DTV) broadcasting standards, is designed to transmit a broadcasting signal by using a frequency allocated for the present analog TV broadcasting. However, for minimizing an influence to the present analog TV broadcasting, the DTV signal is transmitted at a very low intensity compared to the analog TV signal. Of course, the standards are set such that there is no problem in reception of the DTV signal even if the intensity of the signal is low by employing different coding system in the DTV signal and channel equalizers for reducing an influence from noise. However, if a situation of the transmission channel is very poor, the reception of the signal is very poor. In general, since the DTV transmission system has an advantage in that a noise occurred on a transmission channel is removed perfectly at reception of the broadcasting signal, to enable to watch a picture having no noise at all, while the DTV transmission system has a disadvantage in that the picture can not be watched at all if the transmission signal is not recovered fully, it is required that the DTV receiver receives whole signal whatever poor transmission channel the signal has passed.

FIG. 1 illustrates a block diagram of a related art VSB system DTV receiver, wherein, upon reception of a RF (Radio Frequency) signal modulated in a VSB system through an antenna 101, after selecting a particular channel frequency the user desires, a tuner 102 converts the RF band VSB signal carried on the channel frequency into an IF band (Intermediate Frequency band) signal (in general 44 MHz or, in the case of analog TV broadcasting, 43.75 MHz is used widely), and filters out other channel signals, appropriately.

The signal from the tuner 102, which converts a spectrum of channels into an IF pass band signal, passes a SAW (Surface Acoustic Wave) filter 103 employed for removing neighboring channel signals, and the noise signal.

In this instance, since the digital broadcasting signal has all information within a 6 MHz zone centered on, for an example, the IF of 44 MHz, the SAW filter 103 removes other zones from the output of the tuner 102, only leaving the 6 MHz zone having the information, and provides to an IF amplifier 104.

The IF amplifier 104 multiplies a gain calculated beforehand to the output from the SAW filter 103 for making an amplitude of the signal from an A/D converter 105 after the IF amplifier 104 the same always. Accordingly, the A/D converter 105 receives and digitizes signals of the same amplitude from the IF amplifier 104. The passband signal digitized at the A/D converter 105 is transited to a baseband signal at the carrier recoverer 106, and provided to a DC remover 107. In this instance, the carrier used in recovering the carrier at the carrier recoverer 106 is turned to a DC component having 0 Hz frequency.

That is, the DC component is forcibly inserted into a transmission signal at a transmitter so as to perform the carrier recovery at the carrier recoverer. Therefore, after the carrier recovery is done, the DC component inserted at the transmitter is required no more. According to this, the DC remover 107 detects and removes the DC component from the baseband signal from the carrier recoverer 106. The baseband digital signal having the DC component removed therefrom is provided both to a synchronizer 108 and a channel equalizer.

The most remarkable features of the VSB transmission system suggested by the Grand Alliance (GA) compared to other DTV transmission system are a pilot signal, a data segment synchronizing signal, and a field synchronizing signal. The signals are inserted at the transmitter before transmission for improving characteristics of carrier recovery and timing recovery.

Accordingly, the synchronizer 108 recovers the data segment synchronizing signal, and the field synchronizing signal from the signal inserted at the time of transmission having the DC component removed therefrom. The synchronizing signals obtained thus are provided to the channel equalizer 109, a phase corrector 110, and an FEC 111.

The channel equalizer 109 removes a linear distortion of an amplitude in the baseband digital signal causing interference between symbols, ghost occurred as the signal is reflected at buildings or mountain, and the like by using the baseband digital signal and the synchronizing signal, and provides to the phase corrector 110.

Referring to FIG. 1, the signal passed through all analog processes is converted into a digital signal at the A/D converter 105 and provided to the carrier recoverer 106. Therefore, all of the digital process blocks after the carrier recoverer 106 cannot make regular operation if the carrier recovery is not made at the carrier recoverer 106.

FIG. 2 shows characteristics of an airwave signal frequency defined as present DTV standards in Korea and in the United States. Center frequency is transcribed as fc, and pilot frequency is transcribed as fp. A center frequency and a pilot frequency are different in each channel. For example, a frequency in the center of 6 MHz width of each ground wave channel is the center frequency, and a frequency having carrier signal on the transmission signals is called the pilot signal. Pilot is a carrier having a reduced size for DTV signals not to interfere analog TV signals.

If there is no linear ghost in the signals inputted to the DTV receiver, the carrier recoverer 106 is able to recover a location of the pilot frequency on the signal frequency because the amplitude of data and the pilot is consistent.

However, if there is linear ghost in the signals inputted to the DTV receiver, the relative amplitude of data and pilot is changed by delaying time of the linear ghost and phase difference.

FIGS. 3a and 3b are diagrams showing shape of pass band frequency when time delay of ghost is generated in a $1^{st}$ symbol section. FIG. 3a shows a frequency characteristic when the phase difference of ghost is 0°, and FIG. 3b shows a frequency characteristic when the phase difference of the ghost is 180°. Compared to the frequency characteristic in FIG. 2, the amplitude of pilot is larger than that of data in the case of FIG. 3. On the contrary, the amplitude of pilot is smaller than that of data in FIG. 3b.

FIGS. 4a and 4b shows a shape of pass band frequency in case that time delay of ghost is occurred in about 10 symbol section. As illustrated in FIG. 4a, if the phase difference is 0°, the amplitude of pilot is relatively larger than that of data.

And, When the phase difference is 180° as illustrated in FIG. 4b, the amplitude of pilot is smaller than that of data.

As described above, a size of the pilot signal changes in case that there is linear ghost in signals inputted to the DTV receiver. Therefore, accurate carrier recovery can not be carried out.

SUMMARY OF THE INVENTION

Accordingly, the present invention is directed to an apparatus for recovering a carrier that substantially obviates one or more of the problems due to limitations and disadvantages of the related art.

An object of the present invention is to provide an apparatus and a method for recovering a carrier, for recovering a carrier correctly even though ghost exists in a signal received in a television.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, an apparatus for recovering a carrier includes a signal converter outputting baseband I, Q signals by multiplying digitized passband I, Q signals by a complex carrier according to a phase error; first and second filters removing data components of the baseband I, Q signals; a divider dividing a signal outputted from the second filter by a signal outputted from the first filter; a multiplier multiplying a signal outputted from the divider by the baseband I signal delayed for a predetermined time period; and an oscillator generating a complex carrier according to a signal outputted from the multiplier.

Also, a method for recovering a carrier includes (a) converting digitized passband I, Q signals to baseband I, Q signals; (b) removing data components from the baseband I, Q signals; (c) dividing the baseband Q signal having the data component removed therefrom by the baseband I signal having the data component removed therefrom; (d) delaying the baseband I signal having the data component removed therefrom for a predetermined time period, and multiplying the delayed baseband I signal by the division result; and (e) generating a complex carrier according to the multiplication result.

In another aspect, an apparatus for recovering a carrier includes a signal converter outputting baseband I, Q signals by multiplying digitized passband I, Q signals by a complex carrier according to a phase error; first and second filters transmitting pilot components of the baseband I, Q signals; a divider dividing the pilot component of the baseband Q signal by the pilot component of the baseband I signal; a delay delaying the pilot component of the baseband I signal for a predetermined time period; a gain multiplier multiplying a signal outputted from the divider by a constant gain according to a signal outputted from the delay; a multiplier multiplying a signal outputted from the gain multiplier by the signal outputted from the delay; and an oscillator generating a complex carrier according to a signal outputted from the multiplier.

Also, a method for recovering a carrier includes (a) outputting baseband I, Q signals by multiplying digitized passband I, Q signals by a complex carrier according to a phase error; (b) filtering the baseband I, Q signals to transmit pilot components thereof; (c) dividing the pilot component of the baseband Q signal by the pilot component of the baseband I signal; (d) delaying the pilot component of the baseband I signal for a predetermined time period, and multiplying the division result by a constant gain according to the pilot component of the delayed baseband I signal; and (e) generating a complex carrier according to the multiplication result.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

Figure 5:
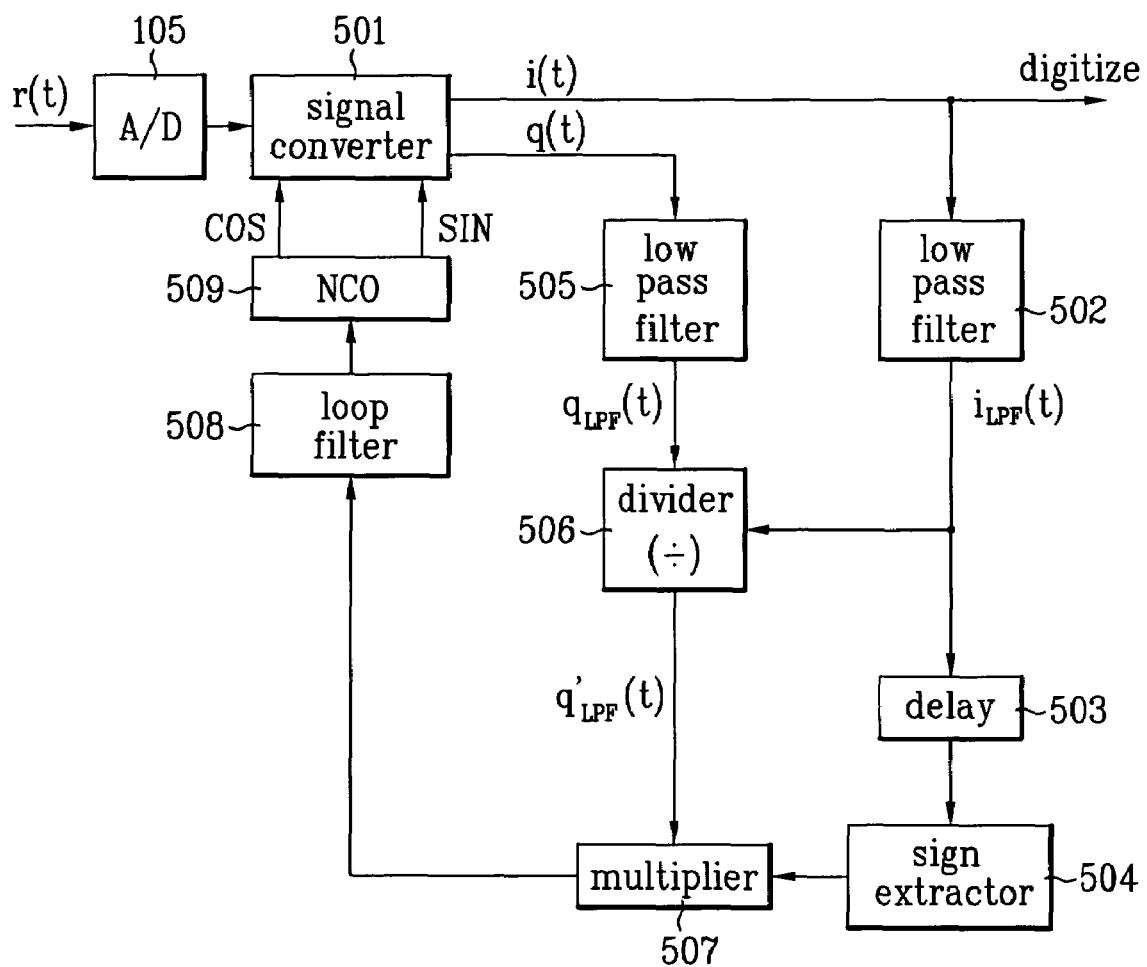
FIG. 5 is a block diagram of an apparatus for recovering a carrier according to the first embodiment of the present invention.

FIG. 5 is a block diagram of an apparatus for recovering a carrier according to the first embodiment of the present invention.

As shown in FIG. 5, passband I, Q signals are digitized in an A/D converter 105, and then inputted to a signal converter 501. At this time, the signal converter 501 receives a complex carrier (SIN, COS), having carrier recovery done, through an NCO (Numerically Controlled Oscillator) 509, and multiplies the passband I, Q signals outputted from the A/D converter 105 by the complex carrier, for transit of the passband I, Q signals to baseband I, Q signals.

Figure 1:
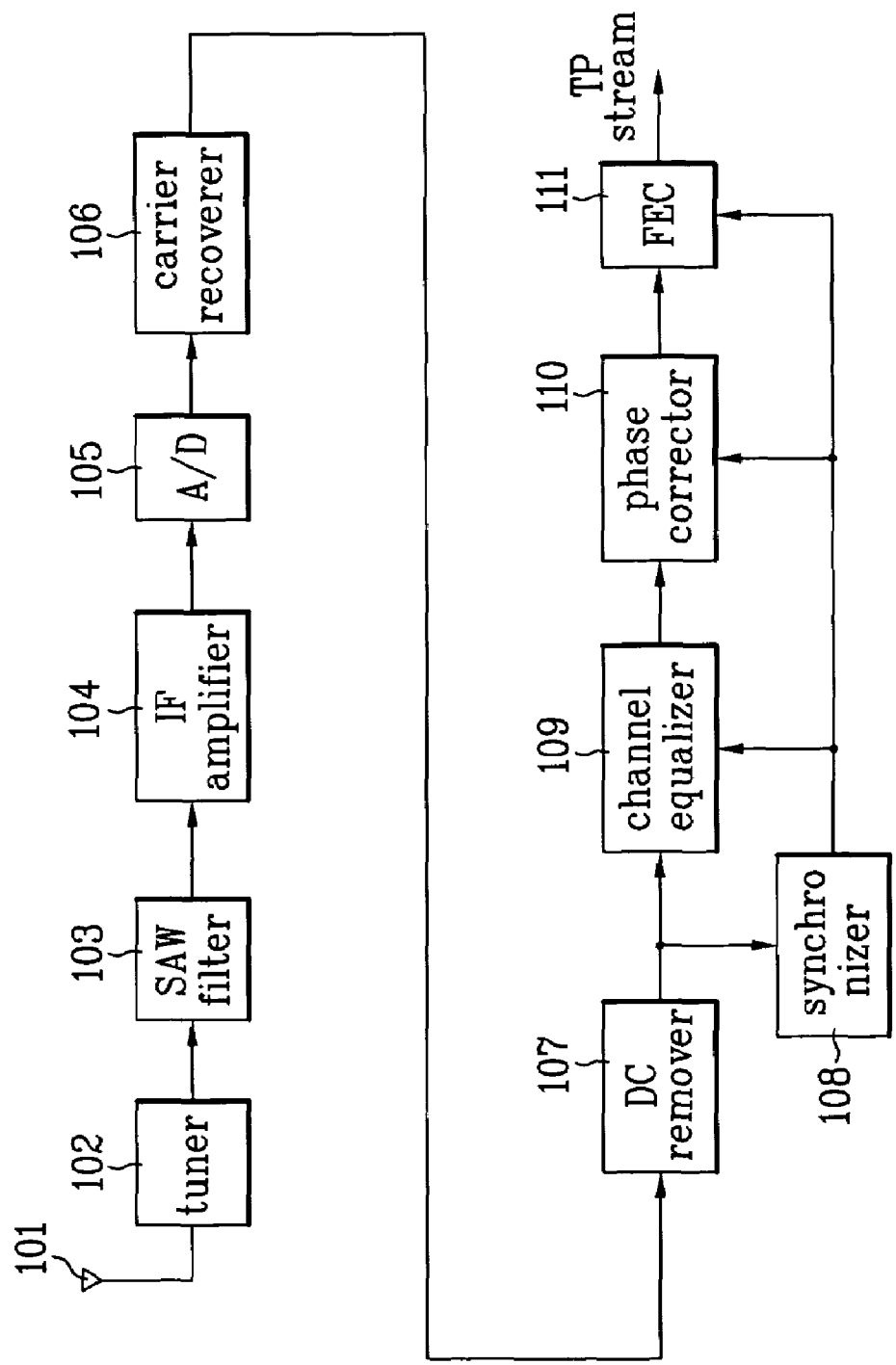
FIG. 1 is a block diagram of a general digital TV receiver.
Figure 2:
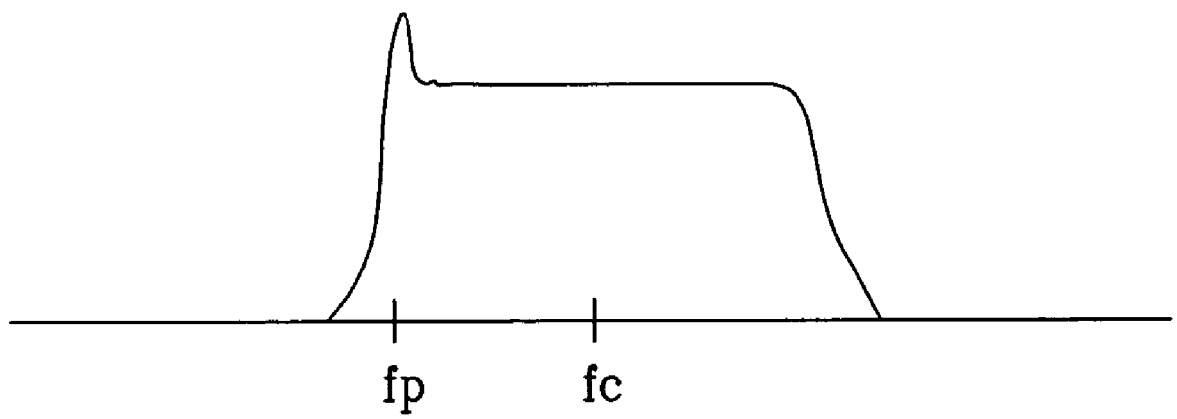
FIG. 2 is a spectrum illustrating frequency characteristics of a general airwave signal.
Figure 3A:
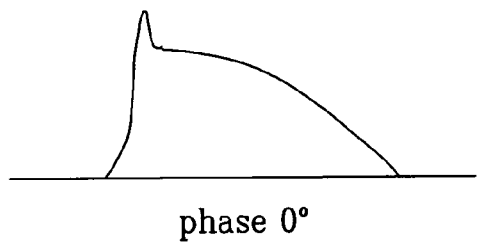
FIG. 3A and FIG. 3B are spectrums illustrating frequency characteristics of an airwave signal in case of ghost of about 1 symbol delay.
Figure 3B:
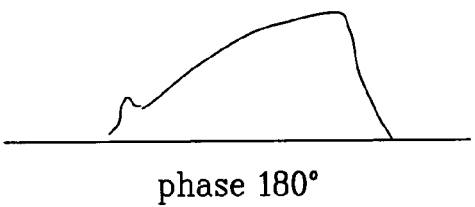
Figure 4A:
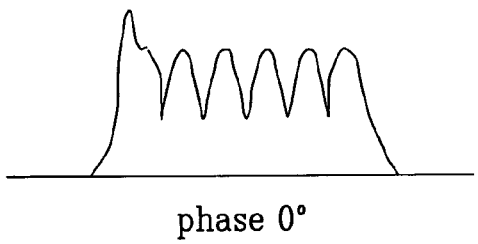
FIG. 4A and FIG. 4B are spectrums illustrating frequency characteristics of an airwave signal in case of ghost of about 10 symbol delay.
Figure 4B:
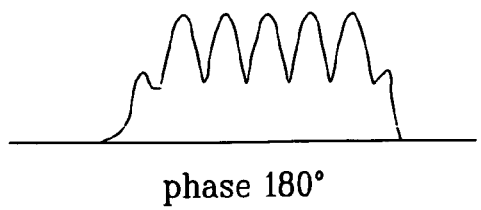

The baseband I, Q signals are outputted to a DC remover (107 of FIG. 1). Also, for recovery of the carrier, the baseband I signal is outputted to a first lowpass filter 502, and the baseband Q signal is outputted to a second lowpass filter 505. At this time, it requires components in the vicinity of the frequency having a pilot frequency (fp) among the 6 MHz bandwidth. Accordingly, the first and second lowpass filters 502 and 505 remove a frequency component having data therein from the baseband I, Q signals. That is, the component in the vicinity of a DC position is required for recovering the carrier. In this respect, the rest is removed except the component in the vicinity of the DC position. Thus, it is possible to prevent a performance of recovering the carrier from being deteriorated by the data.

The signal outputted from the first lowpass filter 502 is inputted to a delay 503 and a divider 506. The delay 503 delays I signal having the data removed therefrom for a predetermined time period, and then outputs the delayed I signal to a sign extractor 504. At this time, the delay 503 converts a difference between the pilot (carrier) frequency component of the baseband signal inputted from the external and the carrier frequency component outputted from the NCO 509 to a phase error. Also, the sign extractor 504 extracts a sign from the signal outputted from the delay 503, and outputs the extracted sign to a multiplier 507.

The signal outputted from the second lowpass filter 505 is inputted to the divider 506. In the divider 506, the signal outputted from the second lowpass filter 505 serves for a dividend, and the signal outputted from the first lowpass filter 502 serves for a divisor. In this state, the divider 506 performs a division of the signal, thereby outputting the division result to the multiplier 507.

The multiplier 507 calculates a phase error component between the carriers inputted from the external and outputted from the NCO 509 by multiplying the output signal of the sign extractor 504 by the output signal of the divider 506. After that, the value of the phase error component between the two carriers is inputted to a loop filter 508. The loop filter 508 filters and accumulates the phase error from the phase error component, and then outputs the result to the NCO 509. Then, the NCO 509 generates the complex carrier (COS, SIN) proportional to the signal outputted from the loop filter 508, and then provides the complex carrier to the signal converter 501.

Hereinafter, a method for recovering the carrier in the apparatus for recovering the carrier according to the first embodiment of the present invention will be described in detail.

First, the A/D converter 105 receives and digitizes an analog signal. At this time, the signal inputted to the A/D converter 105 can be expressed as the following equations (1) and (2). The equation (1) indicates the signal having no ghost, and the equation (2) indicates the signal having the ghost therein.

$$r(t) = \{I(t)+p\}\cos(w_c t+\phi) - Q(t)\sin(w_c t+\phi) \quad \text{equation (1)}$$

At this time, $w_c$ is a frequency of the carrier signal inputted from the external, $\phi$ is a phase of the carrier signal, I(t) is an information signal to be transmitted from a broadcasting transmitter, Q(t) is a rectangular component, and p is a pilot component inserted to a broadcasting signal by the broadcasting transmitter for recovering the carrier.

$$r(t) = \{I(t) + p\}\cos(w_c t + \phi) - Q(t)\sin(w_c t + \phi) + \alpha[\{I(t-\tau) + p\}\cos(w_c(t-\tau) + \phi + \theta) - Q(t-\tau)\sin(w_c(t-\tau) + \phi + \theta)] \quad \text{equation (2)}$$

At this time, $\alpha$ is strength of ghost, $\tau$ is a delay time period of ghost, and $\theta$ is a phase of ghost. If it is assumed that $-w_c\tau+\theta$ is $\theta_g$, the equation (2) can be expressed as the following equation (3).

$$r(t) = \{I(t) + p\}\cos(w_c t + \phi) - Q(t)\sin(w_c t + \phi) + \alpha[\{I(t-\tau) + p\}\cos(w_c t + \phi + \theta_g) - Q(t-\tau)\sin(w_c t + \phi + \theta_g)] \quad \text{equation (3)}$$

Referring to the equation (1), if the signal inputted to the A/D converter 105 has no ghost, it has the problem of recovering the carrier. However, referring to the equation (2), if the ghost exists in the signal inputted to the A/D converter 105, the carrier is recovered in due consideration of the strength of the pilot component.

The signal converter 501 converts the signal outputted from the A/D converter 105, i.e., the signal having the ghost, to the baseband signal. The baseband signal is classified into baseband i(t) and q(t) signals, which can be expressed as the following equations (4) and (5).

$$i(t)=I'(t)\cos(\Delta w_c t+\phi)-Q'(t)\sin(\Delta w_c t+\phi) \quad \text{equation (4)}$$

$$q(t)=I'(t)\sin(\Delta w_c t+\phi)+Q'(t)\cos(\Delta w_c t+\Phi) \quad \text{equation (5)}$$

At this time, $\Delta w_c t$ is the difference between the carrier frequency $w_c$ of the signal inputted from the external and the carrier frequency $w'_c$ outputted from the NCO 509. Herein, $\Delta w_c t$, I'(t) and Q'(t) of the equations (4) and (5) can be expressed as the following equations (6), (7) and (8).

$$\Delta w_c t = w_c - w'_c \quad \text{equation (6)}$$

$$I'(t)=\{I(t)+p\}+\alpha\cos\theta_g\{I(t-\tau)+p\}-\alpha\sin\theta_g Q(t-\tau) \quad \text{equation (7)}$$

$$Q'(t)=Q(t)+\alpha\cos\theta_g Q(t-\tau)+\alpha\sin\theta_g\{I(t-\tau)+p\} \quad \text{equation (8)}$$

Even though the ghost exists in the signal inputted from the external, it has no influence on a Frequency Locked Loop FLL process for recovering the frequency difference $\Delta w_c t$ between the two carriers. Also, it is possible to compensate the frequency difference at any rate in a Phase Locked Loop PLL process for recovering the phase difference between the two carriers. Accordingly, it is assumed that the frequencies of the two carriers are the same, $\Delta w_c t=0$. In this case, the equations (4) and (5) can be expressed as the following equations (9) and (10).

$$i(t)=I'(t)\cos\phi-Q'(t)\sin\phi \quad \text{equation (9)}$$

$$q(t)=I'(t)\sin\phi+Q'(t)\cos\theta \quad \text{equation (10)}$$

The first and second lowpass filters 502 and 505 transmit the DC component from the i(t) and q(t) signals. Accordingly, the data component is removed, and the pilot component exists. The signals outputted from the first and second lowpass filters 502 and 505 can be expressed as the following equations (11) and (12).

$$i_{LPF}(t) = p\lfloor\{1 + \alpha\cos\theta_g\}\cos\phi - \alpha\sin\theta_g\sin\phi\rfloor \quad \text{equation (11)}$$
$$= p\{\cos\phi + \alpha\cos(\phi + \theta_g)\}$$

$$q_{LPF}(t) = p\lfloor\{1 + \alpha\cos\theta_g\}\sin\phi - \alpha\sin\theta_g\cos\phi\rfloor \quad \text{equation (12)}$$
$$= p\{\sin\phi + \alpha\sin(\phi + \theta_g)\}$$

If it is assumed that the ghost has the same strength as that of the original signal outputted from the broadcasting transmitter ($\alpha$=1), the equations (11) and (12) can be expressed as the following equations (13) and (14).

$$i_{LPF}(t) = 2p\,\cos(\theta_g/2)\cos(\phi+\theta_g/2) \quad \text{equation (13)}$$

$$q_{LPF}(t) = 2p\,\cos(\theta_g/2)\sin(\phi+\theta_g/2) \quad \text{equation (14)}$$

Referring to the equation (14), if it is assumed that the ghost exists in the signal inputted from the external, the strength 2 p cos($\theta_g$/2) of the pilot component $q_{LPF}(t)$ is not constant. That is, the strength value 2 p cos($\theta_g$/2) of the pilot component $q_{LPF}(t)$ is varied between 0 p and 2 p according to the $\theta_g$ value. Also, it is possible to obtain a correct convergence position of the PLL process not in case of $\phi$=0, but in case of $\phi+\theta_g/2$=0. Accordingly, in case the external signal is already distorted before the signal inputted from the external is inputted to the apparatus for recovering the carrier, or the apparatus for recovering the carrier has no information about $\theta_g$/2, it is impossible to obtain the correct convergence position of the PLL process when $\phi$=0.

An object of the present invention is to provide the apparatus for recovering the carrier, in which it is possible to obtain the correct convergence position of the PLL process according to the signal inputted from the external. Accordingly, in the apparatus for recovering the carrier according to the present invention, the change of the convergence position by distortion of the input signal is negligible. Especially, even though the strength of the baseband Q signal $q_{LPF}(t)$ filtered by the lowpass filter is close to '0', it is possible to perform the PLL process smoothly.

Herein, if it is assumed that 2 p cos($\theta_g$/2) of the equations (13) and (14) is 'k', the equations (13) and (14) can be expressed as the following equations (15) and (16).

$$i_{LPF}(t) = k\,\cos(\phi+\theta_g/2) \quad \text{equation (15)}$$

$$q_{LPF}(t) = k\,\sin(\phi+\theta_g/2) \quad \text{equation (16)}$$

Then, the signal outputted from the first lowpass filter 502 is inputted to the delay 503 and the divider 506, and the signal outputted from the second lowpass filter 505 is inputted to the divider 506. The delay 503 delays I signal having the data removed therefrom for the predetermined time period, and outputs the delayed I signal to the sign extractor 504. At this time, the delay 503 detects the phase difference between the pilot (carrier) component of the baseband signal inputted from the external and the carrier component outputted from the NCO 509. Also, the sign extractor 504 extracts the sign from the signal outputted from the delay 503, and outputs the extracted sign to the multiplier 507. In the divider 506, the signal outputted from the second lowpass filter 505 serves for the dividend, and the signal outputted from the first lowpass filter 502 serves for the divisor. In this state, the divider 506 performs the division of the signal.

Meanwhile, a related art apparatus for recovering a carrier uses only $q_{LPF}(t)$ signal in the PLL process. That is, if the strength of the $q_{LPF}(t)$ signal is low, it is hard to compensate the phase difference. In order to overcome the aforementioned problem in the related art apparatus for recovering the carrier, the apparatus for recovering the carrier according to the present invention uses the two baseband signals $q_{LPF}(t)$ and $i_{LPF}(t)$. Referring to the following equation (17), the divider 506 divides the signal outputted from the second lowpass filter 505 by the signal outputted from the first lowpass filter 502.

$$q'_{LPF}(t) = \frac{q_{LPF}(t)}{i_{LPF}(t)} = \tan\left(\theta + \frac{\theta_g}{2}\right) \quad \text{equation (17)}$$

Figure 6:
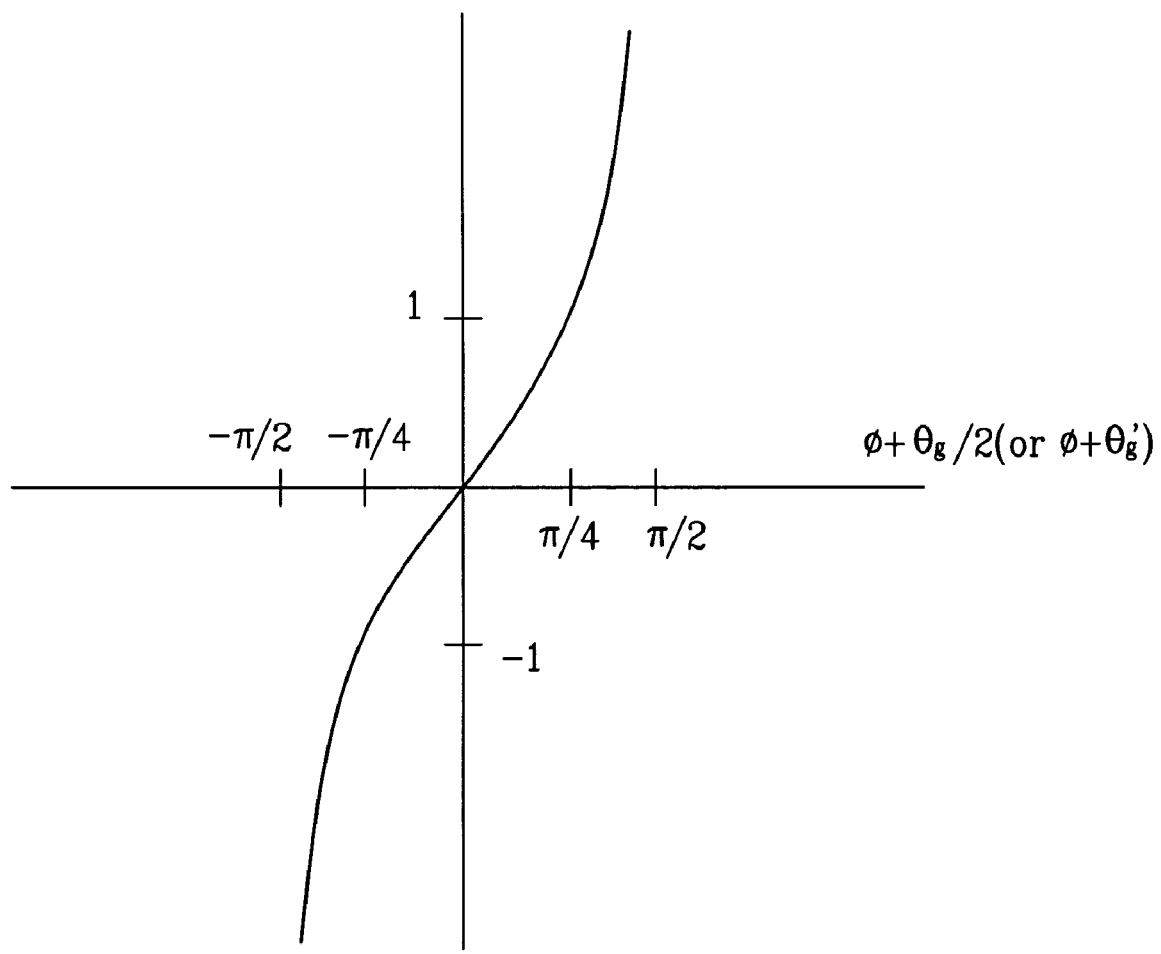
FIG. 6 illustrates S-curve by the apparatus for recovering a carrier of FIG. 5.

When calculating S-curve according to the equation (17), as show in FIG. 6, it is possible to obtain S-curve showing the phase difference, $\phi+\theta_g/2$, between the two carriers having the constant strength regardless of existence of the ghost. At this time, if it is assumed that $\alpha$=1 in the equation (17), the ghost has the same strength as that of the original signal outputted from the broadcasting transmitter. In case of $\alpha\neq1$, S-curve can be obtained according to the following equation (18).

$$q'_{LPF}(t) = \frac{q_{LPF}(t)}{i_{LPF}(t)} = \tan(\phi + \theta'_g) \quad \text{equation (18)}$$

At this time, $\theta'_g$ is lower than $\theta_g/2$. If the strength of the ghost is lower than the strength of the original signal, as shown in FIG. 6, it is possible to obtain S-curve showing the phases of the two carriers having the constant strength. Then, the multiplier 507 multiplies the signal outputted from the divider 506 by the signal outputted from the sign extractor 504, and then outputs the multiplication result to the loop filter 508. After that, the loop filter 508 filters, accumulates and outputs the multiplication result to the NCO 509. Subsequently, the NCO 509 generates the complex carrier proportional to the output of the loop filter 508, and outputs the complex carrier to the signal converter 501. On repetition of the aforementioned process steps, the carrier frequency signal similar to the carrier frequency component of the signal inputted from the external is generated in the NCO 509, and then the carrier frequency signal is outputted to the signal converter 501. Thus, the signal converter 501 transits a passband VSB signal to a desired baseband VSB signal.

Second Embodiment

Figure 7:
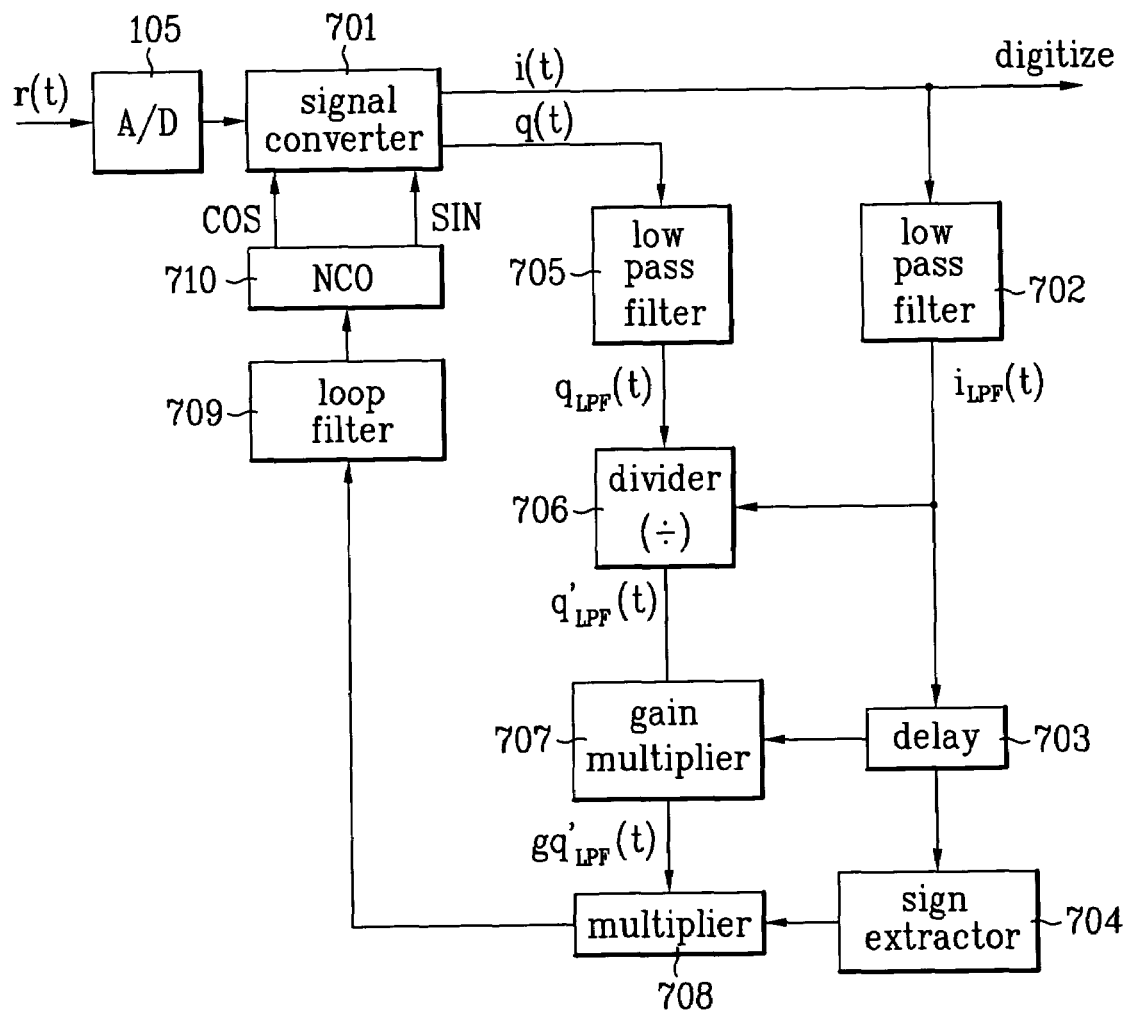
FIG. 7 is a block diagram of an apparatus for recovering a carrier according to the second embodiment of the present invention.

FIG. 7 is a block diagram of an apparatus for recovering a carrier according to the second embodiment of the present invention. As shown in FIG. 7, passband I, Q signals are digitized in an A/D converter 105, and then inputted to a signal converter 701. At this time, the signal converter 701 receives a complex carrier (SIN, COS), having carrier recovery done, through an NCO (Numerically Controlled Oscillator) 710, and then multiplies the complex carrier by the passband I, Q signals, thereby converting the passband I, Q signals to baseband I, Q signals.

The baseband I, Q signals are outputted to a DC remover (107 of FIG. 1). Also, for recovery of the carrier, the baseband I signal is outputted to a first lowpass filter 702, and the baseband Q signal is outputted to a second lowpass filter 705. At this time, it requires components in the vicinity of the frequency having a pilot frequency (fp) among the 6 MHz bandwidth. Thus, the first and second lowpass filters 702 and 705 remove a frequency component having data therein from the baseband I, Q signals.

The signal outputted from the first lowpass filter 702 is inputted to a delay 703 and a divider 706. The delay 703 delays I signal having the data removed therefrom for a predetermined time period, and then outputs the delayed I signal to a sign extractor 704. At this time, the delay 703 converts a difference between the pilot (carrier) frequency component of the baseband signal inputted from the external and the carrier frequency component outputted from the NCO 710 to a phase error. Also, the sign extractor 704 extracts a sign from the signal outputted from the delay 703, and outputs the extracted sign to a multiplier 708.

The signal outputted from the second lowpass filter 705 is inputted to the divider 706. In the divider 706, the signal outputted from the second lowpass filter 705 serves for a dividend, and the signal outputted from the first lowpass filter 702 serves for a divisor. In this state, the divider 706 performs a division of the signal, thereby outputting the division result to a gain multiplier 707.

Figure 8:
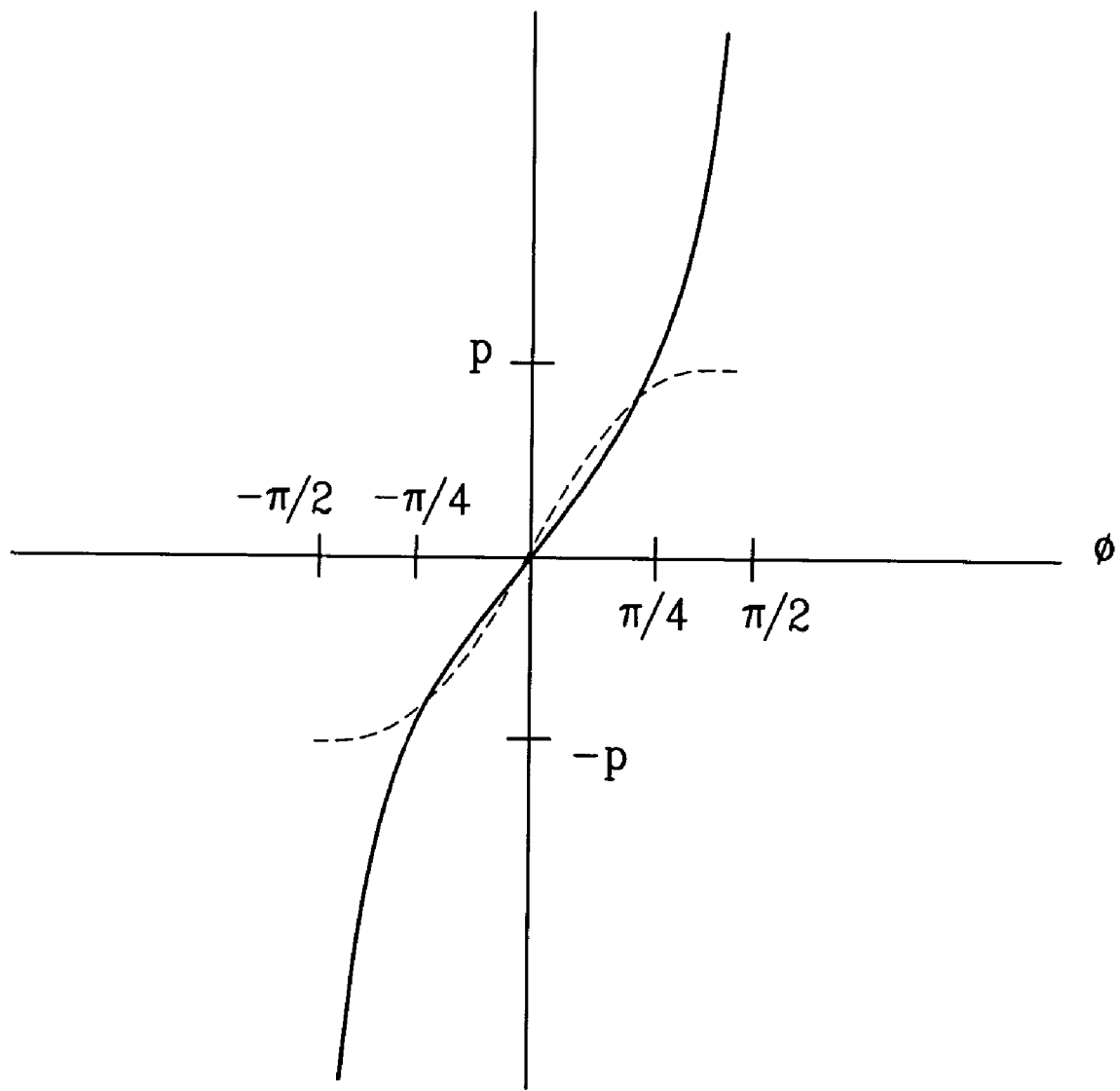
FIG. 8 illustrates S-curve by the apparatus for recovering a carrier of FIG. 7.

The gain multiplier 707 multiplies the signal outputted from the divider 706 by a gain 'g' according to the signal outputted from the delay 703, for preventing the phase difference φ between the two carriers from being changed according to the strength change of the pilot signal by the ghost. For example, if the gain 'g' multiplied by the output signal of the divider 706 in the gain multiplier 707 is the same with the pilot strength 'p', corresponding S-curve is shown as a solid line of FIG. 8. That is, the gain 'g' compensates the pilot strength 'p', whereby the phase difference φ between the two carriers has the constant value. Accordingly, even though the great ghost (α≅1) exists in the signal inputted from a transmission channel or the external, it is possible to recover the carrier correctly. Also, when the ghost does not exist in the signal inputted from the transmission channel or the external, the S-curve is maintained constantly.

The multiplier 708 multiplies the output signal of the sign extractor 704 by the output signal of the gain multiplier 707, and calculates a phase error component between the carrier inputted from the external and the carrier outputted from the NCO 710. Then, the value of the phase error component between the two carriers is inputted to a loop filter 709. The loop filter 709 filters and accumulates the phase error from the phase error component, and then outputs the phase error to the NCO 710. The NCO 710 generates the complex carrier (COS, SIN) proportional to the signal outputted from the loop filter 709, and then outputs the complex carrier to the signal converter 701.

As mentioned above, the apparatus for recovering the carrier according to the present invention has the following advantages.

In the apparatus for recovering the carrier according to the present invention, the baseband I, Q signals filtered by the lowpass filter are separately used for recovering the carrier. Thus, even though the ghost exists in the signal inputted from the external, it is possible to recover the carrier correctly. Especially, even in case the strength of the baseband Q signal filtered by the lowpass filter is close to '0', it is possible to perform the PLL process smoothly.

Also, the output of the divider is multiplied by the gain 'g', so that the slope of S-curve is similar to the slope of a case having no ghost. That is, even though the strength of the pilot becomes low by the great ghost in the transmission channel, it is possible to recover the carrier correctly.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for recovering a carrier, comprising:
   a signal converter outputting baseband I, Q signals by multiplying digitized passband I, Q signals by a complex carrier according to a phase error;
   first and second filters removing data components of the baseband I, Q signals;
   a divider dividing a signal outputted from the second filter by a signal outputted from the first filter;
   a multiplier multiplying a signal outputted from the divider by the baseband I signal delayed for a predetermined time period; and
   an oscillator generating the complex carrier according to a signal outputted from the multiplier.

2. The apparatus of claim 1, wherein the divider divides a pilot component of the baseband Q signal by a pilot component of the baseband I signal.

3. The apparatus of claim 1, further comprising a gain multiplier multiplying the signal outputted from the divider by a gain according to the delayed baseband I signal.

4. The apparatus of claim 1, further comprising:
   a delay delaying the signal outputted from the first filter for the predetermined time period; and
   a sign extractor extracting a sign of the signal outputted from the delay, and providing the extracted sign to the multiplier.

5. A method for recovering a carrier 1 comprising:
   (a) converting digitized passband I, Q signals to baseband I, Q signals;
   (b) removing data components from the baseband I, Q signals;
   (c) dividing the baseband Q signal having the data component removed therefrom by the baseband I signal having the data component removed therefrom;
   (d) delaying the baseband I signal having the data component removed therefrom for a predetermined time period, and multiplying the delayed baseband I signal by the division result; and
   (e) generating a complex carrier according to the multiplication result.

6. The method of claim 5, further comprising (f) multiplying the division result by a constant gain according to the delayed baseband I signal, after delaying the baseband I signal.

7. An apparatus for recovering a carrier, comprising:
   a signal converter outputting baseband I, Q signals by multiplying digitized passband I, Q signals by a complex carrier according to a phase error;
   first and second filters transmitting pilot components of the baseband I, Q signals;
   a divider dividing the pilot component of the baseband Q signal by the pilot component of the baseband I signal;
   a delay delaying the pilot component of the baseband I signal for a predetermined time period;
   a gain multiplier multiplying a signal outputted from the divider by a constant gain according to a signal outputted from the delay;
   a multiplier multiplying a signal outputted from the gain multiplier by the signal outputted from the delay; and
   an oscillator generating the complex carrier according to a signal outputted from the multiplier.

8. The apparatus of claim 7, further comprising a sign extractor extracting a sign from the pilot component of the baseband I signal outputted from the delay, and providing the extracted sign to the multiplier.

9. A method for recovering a carrier, comprising:
   (a) outputting baseband I, Q signals by multiplying digitized passband I, Q signals by a complex carrier according to a phase error;
   (b) filtering the baseband I, Q signals to transmit pilot components thereof
   (c) dividing the pilot component of the baseband Q signal by the pilot component of the baseband I signal;
   (d) delaying the pilot component of the baseband I signal for a predetermined time period, and multiplying the division result by a constant gain according to the pilot component of the delayed baseband I signal; and
   (e) generating the complex carrier according to the multiplication result.

10. The method of claim 9, further comprising:
   extracting a sign from the pilot component of the delayed baseband I signal;
   calculating the phase error by multiplying the multiplication result by the extracted sign; and
   generating the complex carrier proportional to the phase error.

11. An apparatus for recovering a carrier, comprising:
   a signal converter to output baseband I and Q signals based on a complex carrier;
   at least one filter to remove data components of the baseband I and Q signals and to output filtered baseband I and Q signals;
   a divider to divide the filtered baseband Q signal by the filtered baseband I signal;
   a first multiplier to multiply a signal outputted from the divider by the filtered baseband I signal delayed for a predetermined time period; and
   an oscillator to generate the complex carrier according to a signal outputted from the first multiplier and to supply the complex carrier to the signal converter.

12. The apparatus of claim 11, further comprising: a second multiplier disposed between the divider and the first multiplier.

* * * * *